US012587447B2

(12) United States Patent
Schulz et al.

(10) Patent No.: US 12,587,447 B2
(45) Date of Patent: Mar. 24, 2026

(54) METHOD FOR OPTIMIZING A PROCESS AUTOMATION NETWORK

(71) Applicant: ABB Schweiz AG, Baden (CH)

(72) Inventors: Dirk Schulz, Meckenheim (DE);
Abdulkadir Karaagac, Ladenburg (DE)

(73) Assignee: ABB Schweiz AG, Baden (CH)

( * ) Notice: Subject to any disclaimer, the term of this patent is extended or adjusted under 35 U.S.C. 154(b) by 49 days.

(21) Appl. No.: 18/639,520

(22) Filed: Apr. 18, 2024

(65) Prior Publication Data

US 2024/0356811 A1 Oct. 24, 2024

(30) Foreign Application Priority Data

Apr. 21, 2023 (EP) ..................................... 23169199

(51) Int. Cl.
 *H04L 41/14* (2022.01)
 *H04L 41/0823* (2022.01)
(52) U.S. Cl.
 CPC ........ *H04L 41/145* (2013.01); *H04L 41/0823* (2013.01)
(58) Field of Classification Search
 None
 See application file for complete search history.

(56) References Cited

U.S. PATENT DOCUMENTS 9,461,877 B1 10/2016 Nadeau et al.
2021/0382798 A1* 12/2021 Ganesan ............. H04L 43/0876

2022/0286360 A1* 9/2022 Gali ........................ H04L 41/40
2023/0224228 A1* 7/2023 Dahu .................. H04L 41/5022
 709/223
2023/0396505 A1* 12/2023 Carruthers .......... H04L 41/0816

FOREIGN PATENT DOCUMENTS

WO WO 2023/038825 A1 3/2023

OTHER PUBLICATIONS

European Patent Office, Extended European Search Report in European Patent Application No. 23169199.9, 13 pp. (Oct. 10, 2023).

* cited by examiner

*Primary Examiner* — Fadi Haj Said
(74) *Attorney, Agent, or Firm* — Fitch Even Tabin & Flannery LLP

(57) ABSTRACT

A computer implemented method for optimizing a process automation network includes providing topology data of the process automation network that includes network devices to a network controller and providing connectivity requirement data representing intended communication of a process application between communication endpoints of the process to the network controller according to a process application design for creating a network configuration; receiving a network configuration response from the network controller; analyzing the network configuration response for verifying whether the network configuration meets optimization criteria; in dependence on the analysis results, updating the network topology design and/or the process application design and the connectivity requirements, or stopping the optimization of the process automation network.

15 Claims, 7 Drawing Sheets

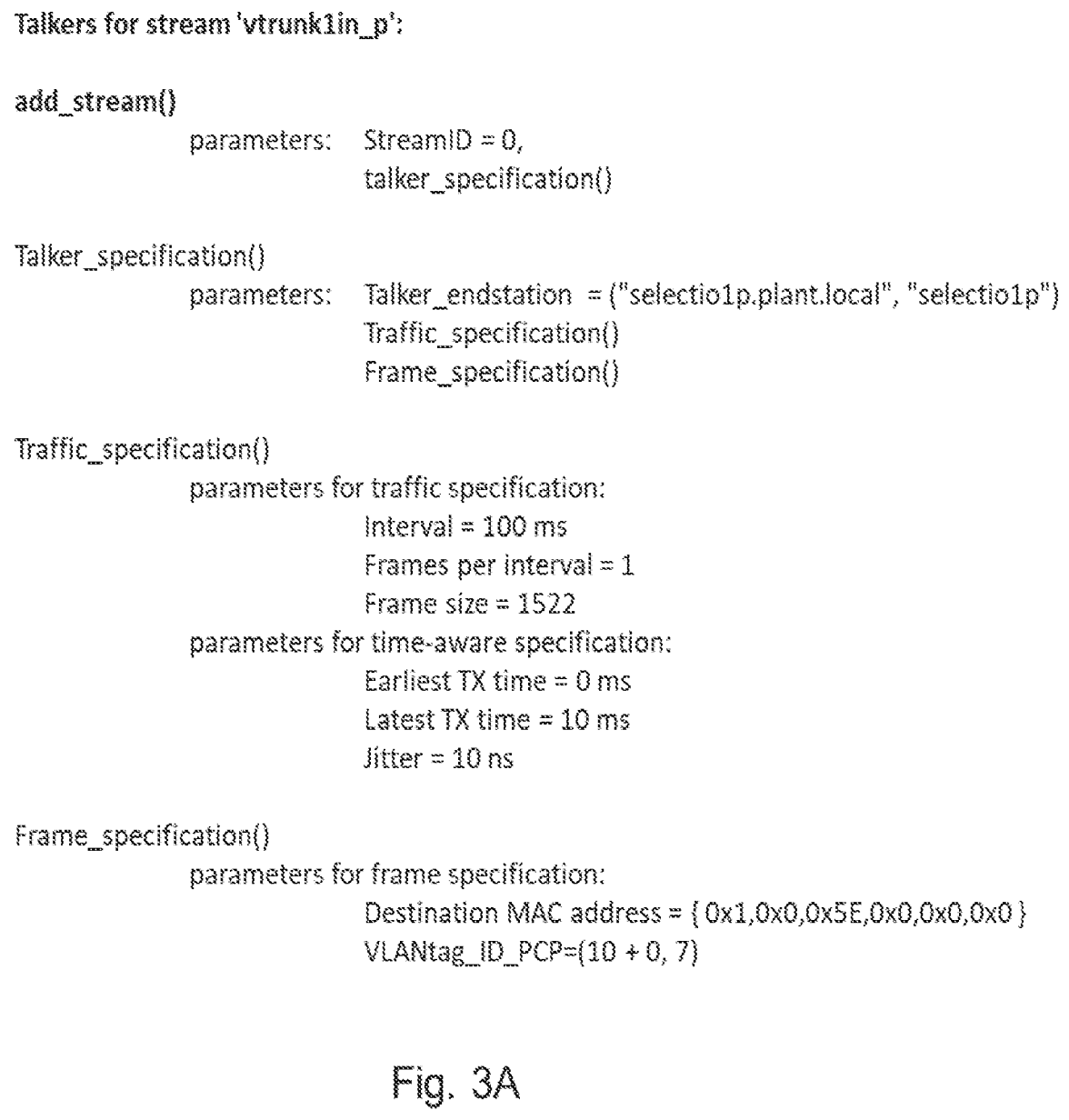

Talkers for stream 'vtrunk1in_p':

add_stream()

parameters:   StreamID = 0, talker_specification()

Talker_specification()

parameters:   Talker_endstation = ("selectio1p.plant.local", "selectio1p")

Traffic_specification()

Frame_specification()

Traffic_specification()

parameters for traffic specification:

Interval = 100 ms

Frames per interval = 1

Frame size = 1522 parameters for time-aware specification:

Earliest TX time = 0 ms

Latest TX time = 10 ms

Jitter = 10 ns

Frame_specification()

parameters for frame specification:

Destination MAC address = { 0x1,0x0,0x5E,0x0,0x0,0x0 }

VLANtag_ID_PCP=(10 + 0, 7)

Fig. 3A

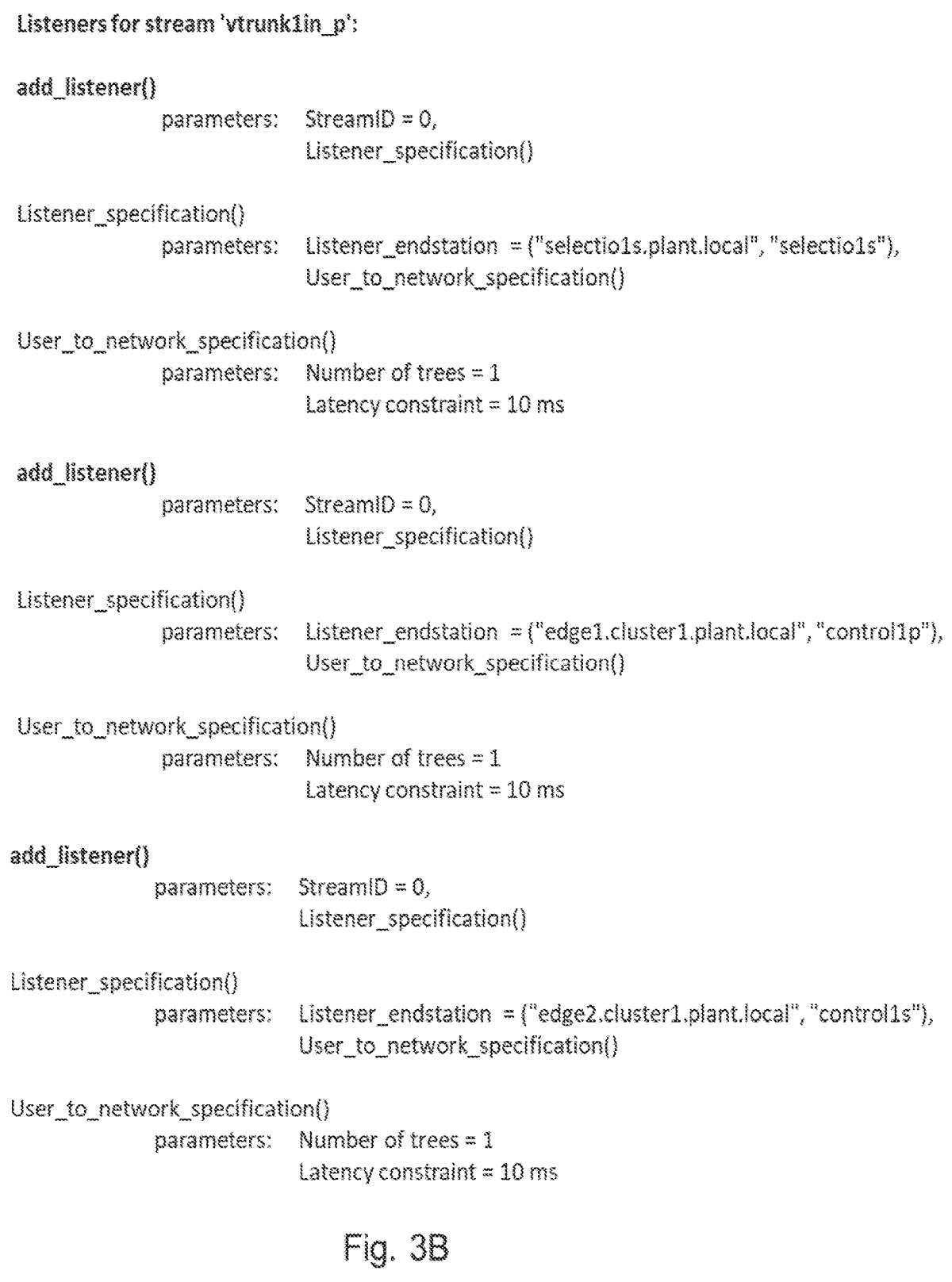

Listeners for stream 'vtrunk1in_p':

add_listener()
　　　　　　　parameters:　StreamID = 0,
　　　　　　　　　　　　　　　Listener_specification()

Listener_specification()
　　　　　　　parameters:　Listener_endstation　= ("selectio1s.plant.local", "selectio1s"),
　　　　　　　　　　　　　　　User_to_network_specification()

User_to_network_specification()
　　　　　　　parameters:　Number of trees = 1
　　　　　　　　　　　　　　　Latency constraint = 10 ms add_listener()
　　　　　　　parameters:　StreamID = 0,
　　　　　　　　　　　　　　　Listener_specification()

Listener_specification()
　　　　　　　parameters:　Listener_endstation　= ("edge1.cluster1.plant.local", "control1p"),
　　　　　　　　　　　　　　　User_to_network_specification()

User_to_network_specification()
　　　　　　　parameters:　Number of trees = 1
　　　　　　　　　　　　　　　Latency constraint = 10 ms add_listener()
　　　　　　　parameters:　StreamID = 0,
　　　　　　　　　　　　　　　Listener_specification()

Listener_specification()
　　　　　　　parameters:　Listener_endstation　= ("edge2.cluster1.plant.local", "control1s"),
　　　　　　　　　　　　　　　User_to_network_specification()

User_to_network_specification()
　　　　　　　parameters:　Number of trees = 1
　　　　　　　　　　　　　　　Latency constraint = 10 ms

Fig. 3B

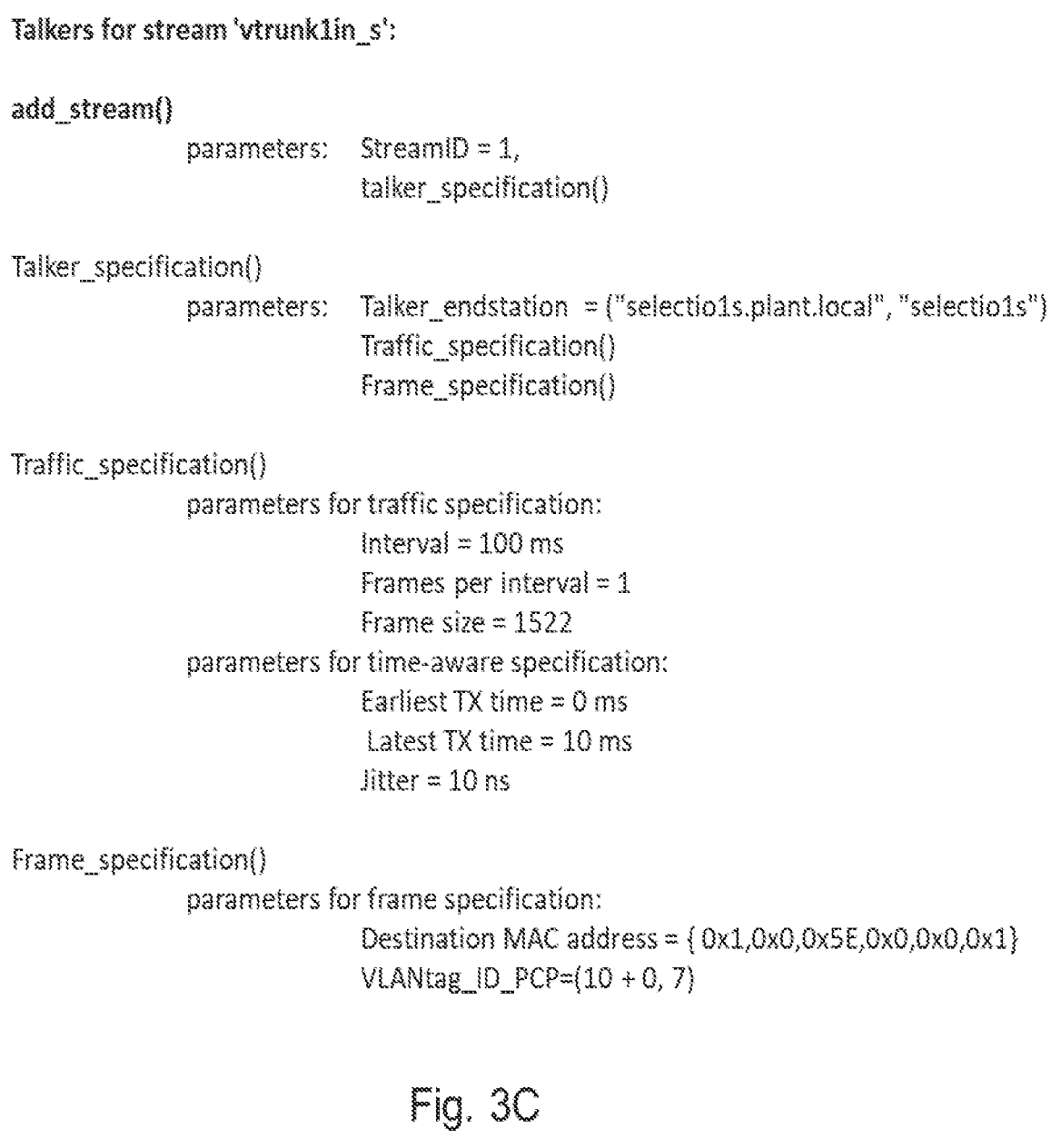

Talkers for stream 'vtrunk1in_s':

add_stream()
            parameters:    StreamID = 1,
                            talker_specification()

Talker_specification()
            parameters:    Talker_endstation = ("selectio1s.plant.local", "selectio1s")
                            Traffic_specification()
                            Frame_specification()

Traffic_specification()
            parameters for traffic specification:
                     Interval = 100 ms
                     Frames per interval = 1
                     Frame size = 1522
            parameters for time-aware specification:
                     Earliest TX time = 0 ms
                     Latest TX time = 10 ms
                     Jitter = 10 ns Frame_specification()
            parameters for frame specification:
                     Destination MAC address = { 0x1,0x0,0x5E,0x0,0x0,0x1}
                     VLANtag_ID_PCP=(10 + 0, 7)

Fig. 3C

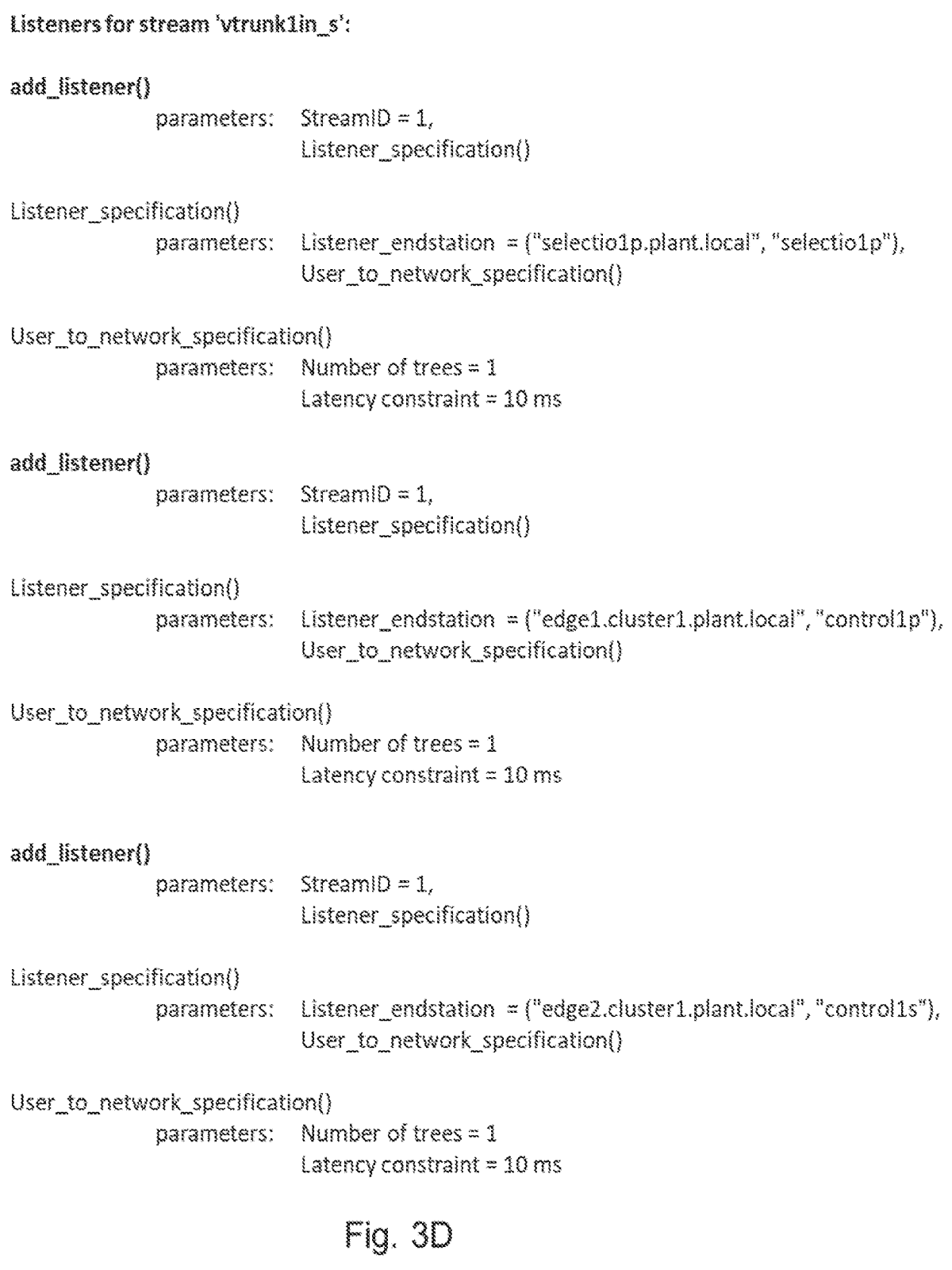

Listeners for stream 'vtrunk1in_s':

add_listener()
                 parameters:    StreamID = 1,
                                      Listener_specification()

Listener_specification()
                 parameters:    Listener_endstation = ("selectio1p.plant.local", "selectio1p"),
                                      User_to_network_specification()

User_to_network_specification()
                 parameters:    Number of trees = 1
                                      Latency constraint = 10 ms add_listener()
                 parameters:    StreamID = 1,
                                      Listener_specification()

Listener_specification()
                 parameters:    Listener_endstation = ("edge1.cluster1.plant.local", "control1p"),
                                      User_to_network_specification()

User_to_network_specification()
                 parameters:    Number of trees = 1
                                      Latency constraint = 10 ms add_listener()
                 parameters:    StreamID = 1,
                                      Listener_specification()

Listener_specification()
                 parameters:    Listener_endstation = ("edge2.cluster1.plant.local", "control1s"),
                                      User_to_network_specification()

User_to_network_specification()
                 parameters:    Number of trees = 1
                                      Latency constraint = 10 ms <div align="center">Fig. 3D</div>

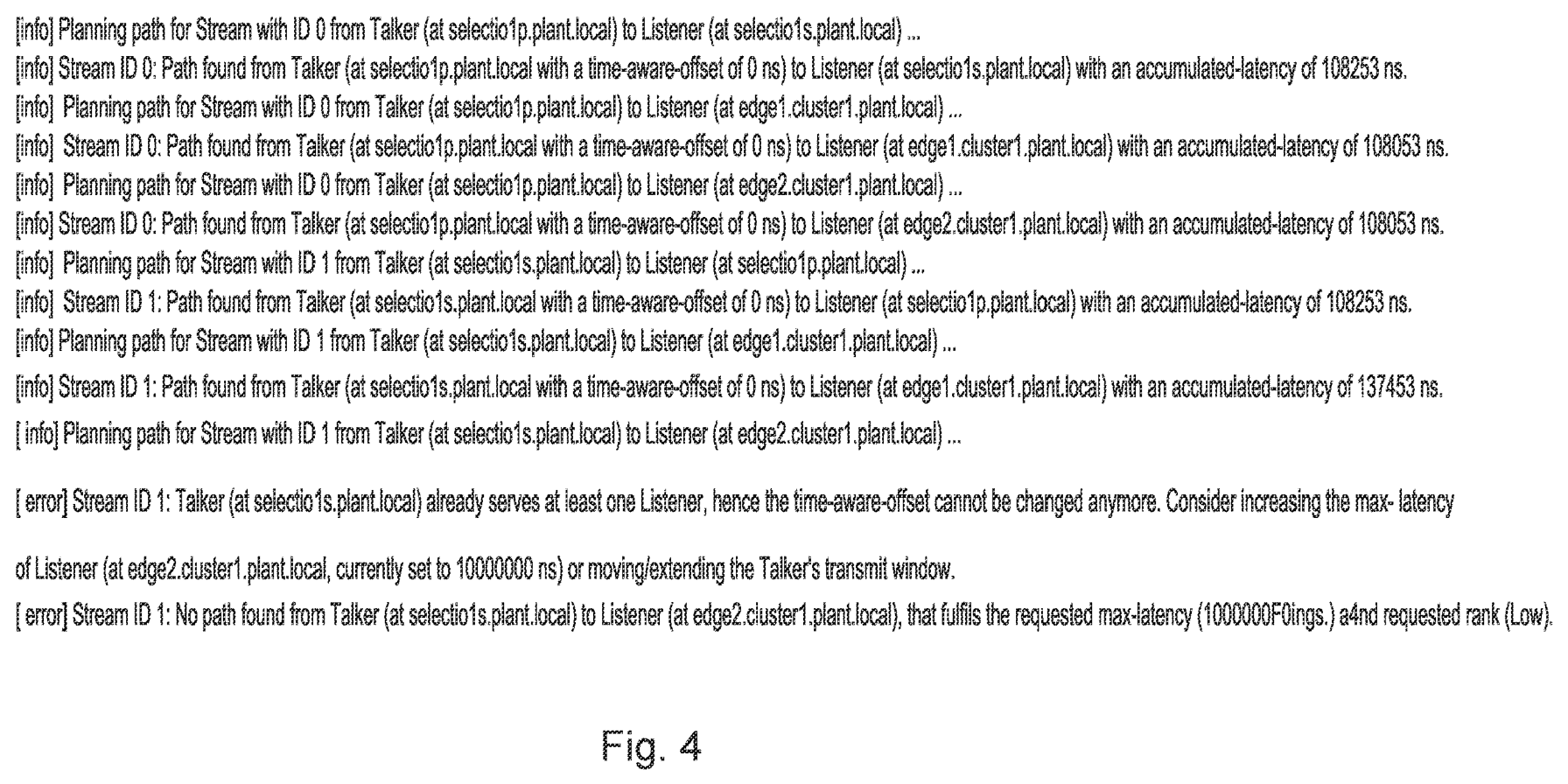

[info] Planning path for Stream with ID 0 from Talker (at selectio1p.plant.local) to Listener (at selectio1s.plant.local) ...

[info] Stream ID 0: Path found from Talker (at selectio1p.plant.local with a time-aware-offset of 0 ns) to Listener (at selectio1s.plant.local) with an accumulated-latency of 108253 ns.

[info] Planning path for Stream with ID 0 from Talker (at selectio1p.plant.local) to Listener (at edge1.cluster1.plant.local) ...

[info] Stream ID 0: Path found from Talker (at selectio1p.plant.local with a time-aware-offset of 0 ns) to Listener (at edge1.cluster1.plant.local) with an accumulated-latency of 108053 ns.

[info] Planning path for Stream with ID 0 from Talker (at selectio1p.plant.local) to Listener (at edge2.cluster1.plant.local) ...

[info] Stream ID 0: Path found from Talker (at selectio1p.plant.local with a time-aware-offset of 0 ns) to Listener (at edge2.cluster1.plant.local) with an accumulated-latency of 108053 ns.

[info] Planning path for Stream with ID 1 from Talker (at selectio1s.plant.local) to Listener (at selectio1p.plant.local) ...

[info] Stream ID 1: Path found from Talker (at selectio1s.plant.local with a time-aware-offset of 0 ns) to Listener (at selectio1p.plant.local) with an accumulated-latency of 108253 ns.

[info] Planning path for Stream with ID 1 from Talker (at selectio1s.plant.local) to Listener (at edge1.cluster1.plant.local) ...

[info] Stream ID 1: Path found from Talker (at selectio1s.plant.local with a time-aware-offset of 0 ns) to Listener (at edge1.cluster1.plant.local) with an accumulated-latency of 137453 ns.

[info] Planning path for Stream with ID 1 from Talker (at selectio1s.plant.local) to Listener (at edge2.cluster1.plant.local) ...

[error] Stream ID 1: Talker (at selectio1s.plant.local) already serves at least one Listener, hence the time-aware-offset cannot be changed anymore. Consider increasing the max- latency of Listener (at edge2.cluster1.plant.local, currently set to 10000000 ns) or moving/extending the Talker's transmit window.

[error] Stream ID 1: No path found from Talker (at selectio1s.plant.local) to Listener (at edge2.cluster1.plant.local) that fulfils the requested max-latency (1000000Fdings) a4nd requested rank (Low).

Fig. 4

METHOD FOR OPTIMIZING A PROCESS AUTOMATION NETWORK

CROSS-REFERENCE TO RELATED APPLICATIONS

The instant application claims priority to European Patent Application No. 23169199.9, filed Apr. 21, 2023, which is incorporated herein in its entirety by reference.

FIELD OF THE DISCLOSURE

The present disclosure relates to a computer implemented method for optimizing a process automation network and a computer readable medium.

BACKGROUND OF THE INVENTION

There are two basic risks in network offline engineering: unnecessary oversizing leads to uncompetitive cost, under-sizing prevents delivering the needed quality. At the same time, spare capacity for changes or system extensions must be considered as well. Finding a network design that is optimal in this sense is difficult before knowing all application details and having the real network available for testing.

This is particularly challenging once traffic shaping mechanisms such as time-slotted Ethernet or per stream filtering and policing need to be used, which require complex network resource reservation schemes beyond configuring VLANs and priority classes. This means we need to already know at network design time if the real network would later have sufficient resources to run the planned applications, which at the same time has no obvious answer even to a networking expert.

Today, we rely on best practices and estimates for mostly dedicated networks, and we rather oversize instead of not being able to meet quality targets, exposing us to customer claims of being too expensive (warranted or not).

BRIEF SUMMARY OF THE INVENTION

There may be a desire to optimize a process automation network. The described embodiments pertain to a method for optimizing a process automation network and a computer readable medium. Synergetic effects may arise from different combinations of the embodiments although they might not be described in detail.

Further on, it shall be noted that all embodiments of the present invention concerning a method might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to an aspect, a computer implemented method for optimizing a process automation network is provided, wherein the method comprises the following steps: as a first step, topology data of the process automation network that includes network devices to a network controller and connectivity requirement data representing intended communication of a process application between communication endpoints of the process is provided to the network controller according to a process application design for creating a network configuration. As a second step, a network configuration response is received from the network controller. As a third step, the network configuration response is analyzed for verifying whether the network configuration meets optimization criteria, and as a fourth step, in dependence on the analysis results, the network topology design and/or the process application design and in turn the connectivity requirements are updated or the optimization of the process automation network is stopped in dependence on the analysis results.

BRIEF DESCRIPTION OF THE SEVERAL VIEWS OF THE DRAWING(S)

FIG. 3A is a simplified form of an example code sequence with API calls to the network controller in accordance with the disclosure.

FIG. 3B is a simplified form of an example code sequence with API calls to the network controller in accordance with the disclosure.

FIG. 3C is a simplified form of an example code sequence with API calls to the network controller in accordance with the disclosure.

FIG. 3D is a simplified form of an example code sequence with API calls to the network controller in accordance with the disclosure.

FIG. 4 is an exemplary script of a response to API calls in accordance with the disclosure.

DETAILED DESCRIPTION OF THE INVENTION

Figure 1:
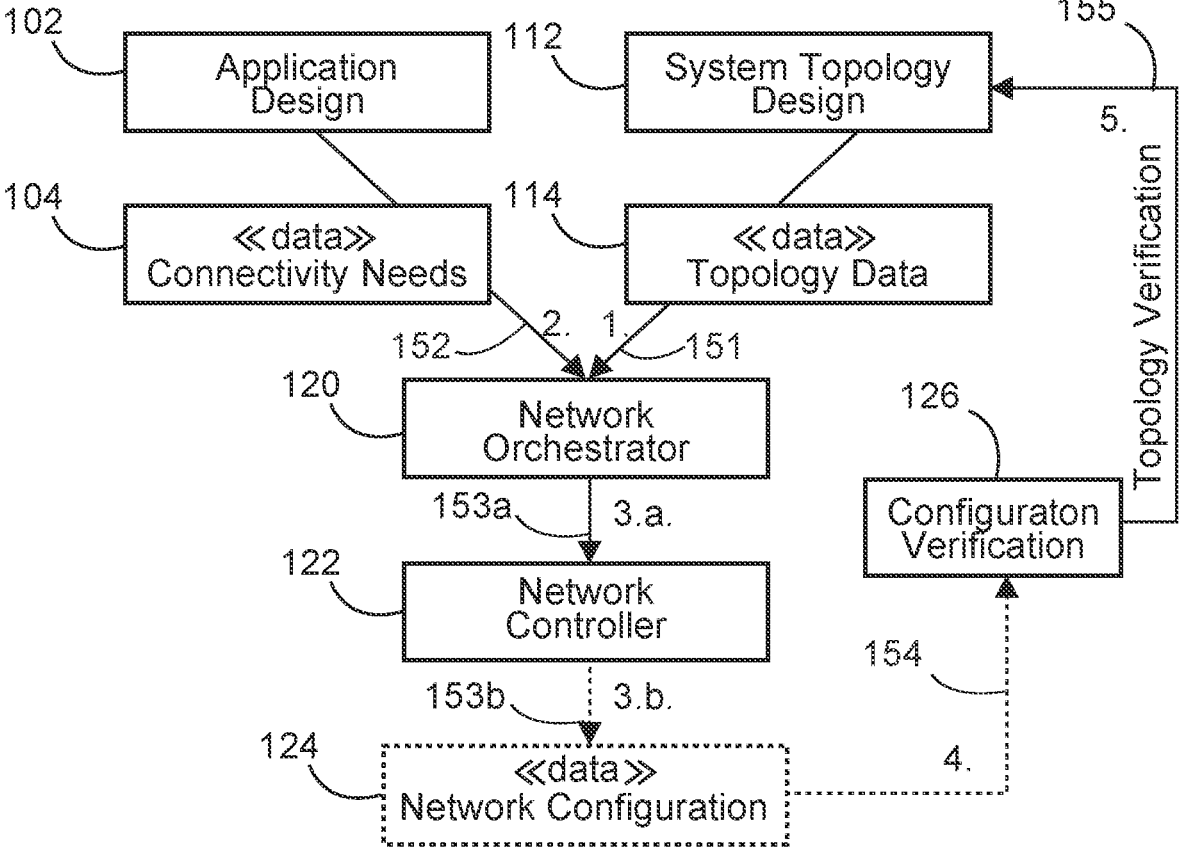
FIG. 1 is a flow diagram of a method in accordance with the disclosure.

Corresponding parts are provided with the same reference symbols in all figures. FIG. 1 shows a flow diagram showing steps of the proposed method. The starting points of the method are two designs: the application design 102 and the system topology design 112.

The system topology design 112 represents the current network topology including virtual and/or physical hardware such as switches, routers, gateways, I/O interfaces, controllers controlling the process devices, etc. The data 114 describing the topology is an input to the network orchestrator, indicated as step 1 (arrow "1." 151 in FIG. 1). The application design 102 represents the devices of the process and the process functions implemented on a controller, the input to and output from the processes and the intended communication between endpoints, including these process devices, servers, HMIs, etc. From the application design 102, connectivity needs 104, i.e., connectivity requirements 104 are derived. The data describing resulting connectivity needs 104 are a further input to a network orchestrator (arrow "2." 152 in FIG. 1). The network orchestrator combines the connectivity requirements data of the applicant design and topology design data, and creates connectivity requests including these data. The connectivity requests are provided to the network controller 122 (arrow "3.a." 153a in FIG. 1), e.g. using API calls. The network controller 122 calculates a resource allocation and generates a configuration for the individual network devices defined in the topology and tries to satisfy the connectivity requirements. The resulting network configuration 124 (see also arrow "3.a." 153*a* in FIG. 1) is now not downloaded (arrow "3.b." 153*b* in FIG. 1), to the network devices but provided to an analyzer 126 (arrow "4." 154 in FIG. 1).

Additionally, the network controller 122 provides information to the analyzer 126 which network devices could not be configured or which resources could not be allocated, as well as, for example, an indication of root-cause. The analyzer 126 evaluates the network configuration and the additional information received from the network controller and checks whether all connectivity requirements including QoS are met, and detects undersized resources or oversized resources. Undersized resources or oversized resources means that network devices are not capable to provide the requested network resources or provide too much resources so that they are used wastefully. For that, the analyzer 126 calculates, for example one or more cost functions that maps the optimization criteria. For example, the value of a cost function has to be higher or lower than a threshold or lie within a range. The parameters in the cost function may be weighted. Spare resources may be taken into account. If the result of the check is that the connection requirements are met, this means that network works are required but might be oversized. Then, the analyzer checks whether resources are oversized. If yes, the network topology is reduced. For example, redundant paths or network devices are deleted from the topology or some of the devices are replaced by devices with lower performance. If, however, the requests cannot be executed, additional network resources have to be provided to the topology. The results are fed back to the system topology design 112 (arrow "5." 155 in FIG. 1). Then, the system topology design 112 and/or set of requests are updated according the results of the analyzer 126. The resulting topology is again the starting position for the next iteration.

Iteration is performed until connectivity requirements can be met and the defined network cost functions are satisfied so that no additional resources are required or resources might be removed. Therefore, when the iterations are finished, it is ensured on one side that the network works and on the other side that the network is neither oversized, nor undersized and still has enough spare capacity, and the loop is closed.

Preferably, the procedure can be performed during nominal operation of the process automation network without affecting the operation or configuration before the optimization is completed.

The above-described method can be expressed as computer implemented method for optimizing a process automation network, wherein the method comprises the steps: providing topology data (151, 153*a*) of the process automation network that includes network devices to a network controller and providing connectivity requirement data (152, 153*a*) representing intended communication of a process application between communication endpoints of the process to the network controller according to a process application design for creating a network configuration. As a second step (154), receiving a network configuration response from the network controller. As a third step (126, 155), analyzing the network configuration response for verifying whether the network configuration meets optimization criteria. As a fourth step, in dependence on the analysis results, updating the network topology design (155, 112) and/or the process application design (155, 102) and in turn the connectivity requirements (104), or stopping the optimization of the process automation network.

Figure 2:
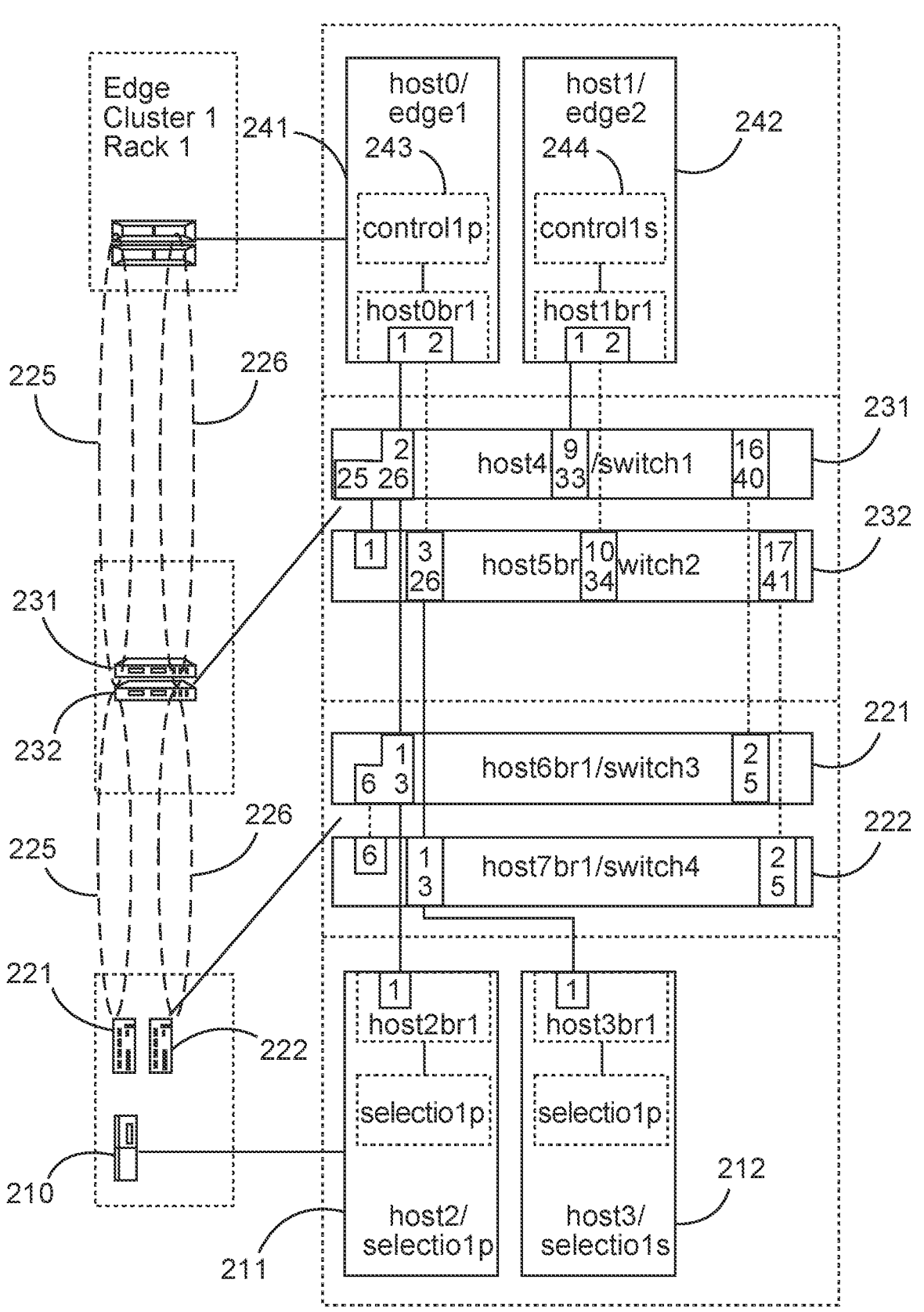
FIG. 2 is an exemplary diagram of a general principle of a method in accordance with the disclosure.

Aspects of the steps of the proposed method are explained with FIGS. 2 to 4. Referring to FIG. 2, relating to step 1 of the method, an example network topology with one remote IO device 210 is shown that has two interfaces 211, 212, i.e., a primary interface 211 "selectio1p" with "host2br1" and secondary interface 212 "selectio1s" with "host3br1". The topology further contains two dual-redundant rings 225, 226, each with one DIN-rail switch 221, 222 and one rack-mounted switch 231, 232, and an edge cluster 240 with two hosts 241, 242 each hosting one instance of a redundant control application 243, 244. FIG. 2 further shows connections from the interfaces "selectio1p" over switches 221 and 231 to the control function "control1p" 243 implemented in "host0/edge1" 241. Similarly, connections from the interfaces "selectio1s" over switches 222 and 232 to the control function "control1s" 244 implemented in "host1/edge2" 242. Further connections are available between switches 231 or 232 and control function 244 and between the switches.

Relating to steps 2 and 3, FIGS. 3A-3D show examples of API calls representing the connectivity requests including some timing and QoS requirements to the network controller by which the network setup for two deterministic streams (using TSN time-slotted Ethernet) is requested.

The first stream with ID 0 is setup as a talker as depicted in FIG. 3A and listeners as depicted in FIG. 3B. The talker is setup by the API call depicted in FIG. 3A: "selectio1p.plant.local", "selectio1p") as a primary IO interface. The first listener is setup by the second API call in FIG. 3B: "edge1.cluster1.plant.local", "control1p" as primary application instance. The second listener is setup by the last API call in FIG. 3B: "edge2.cluster1.plant.local", "control1s" as secondary application instance. The third listener is setup by the first API call in FIG. 3B: "selectio1s.plant.local", "selectio1s" as secondary IO interface.

The API calls for a talker include also parameters and their values specifying the traffic such as frames per interval and frame size, timing parameters such as interval in milliseconds (ms), Earliest and latest TX time in ms within an interval, and quality parameters such as jitters in ns. Further, the call provides a destination MAC address, a VLAN ID and PCP. The API calls for a listener include also parameters and their values for the number of trees and a latency constraint in ms.

The second stream with ID 1 is setup as talkers as depicted in FIG. 3C and listeners as depicted in FIG. 3D. The first talker is setup by the API call depicted in FIG. 3C: "selectio1s.plant.local", "selectio1s") as secondary IO interface. The first listener is setup by the API call second API call in FIG. 3D: "edge1.cluster1.plant.local", "control1p", as primary instance. The second listener is setup by the last API call in FIG. 3D: "edge2.cluster1.plant.local", "control1s" as secondary application instance, and the third listener is setup by the first API call in FIG. 3D: "selectio1p.plant.local", "selectio1p" as primary IO interface. If the API calls are successful, they result in the connections and network setup shown in FIG. 2.

Referring to FIG. 4, the response from the network controller is shown. For example, the network controller provides the information that it is planning a path for Stream with ID 0 from Talker at selectio1p.plant.local to Listener at selectio1s.plant.local. In a next information output, it states that a path from the talker at selectio1p.plant.local (with a time-aware-offset of ( ) ns) to the listener at selectio1s.plant.local has been found, and the accumulated-latency is 108253 ns. The further information outputs have similar content according to the API calls in FIGS. 3A to 3D except of the last two error messages which state that regarding the stream with ID 1, the talker at "selectio1s.plant.local" already serves at least one listener, hence the time-aware-offset cannot be changed anymore. It further suggests considering increasing the max-latency of Listener, i.e. at "edge2.cluster1.plant.local", which is currently set to 10,000,000 ns, or moving or extending the talker's transmit window. The last message summarizes for stream with ID 1 no path found from talker at "selectio1s.plant.local" to "listener at edge2.cluster1.plant.local" could be found that fulfils the requested max-latency of 10,000,000 ns and requested low rank. That is, already in this case, the concrete requested timing requirements mean that no schedule can be found from the secondary IO interface to the secondary controller.

This information is analyzed using also, for example a cost function. In the example, the network resources are undersized. The process application design may be updated in such a way that the latest TX time is relaxed. Alternatively, further network paths, for example fibers, could be added, hence updating the topology. After the updating the application design and/or the topology, the steps of the method are repeated.

The network controller is run in offline mode in closed loop with a network design process, requesting the delivery of a network configuration based on a series of connectivity requests, to verify the correctness of network design. The method may be used to verify a network design without an existing network. Further, the method is used to optimize the bill of material for cost.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

Process automation in the industrial environment can be understood as a subfield of technology that includes all measures for the operation of machines and plants without the involvement of humans. One goal of process automation is to automate the interaction of individual components of a plant in the chemical, food, pharmaceutical, petroleum, paper, cement, shipping or mining industries. For this purpose, a variety of sensors can be used, which are especially adapted to the specific requirements of the process industry, such as mechanical stability, insensitivity to contamination, extreme temperatures and extreme pressures. Measured values from these sensors are usually transmitted to a control room, where process parameters such as level, limit level, flow, pressure or density can be monitored and settings for the entire plant can be changed manually or automatically.

A sub-area of process automation or process automation in the industrial environment concerns logistics automation. In the field of logistics automation, distance and angle sensors are used to automate processes within a building or within an individual logistics facility. Typical applications include systems for logistics automation in the area of baggage and freight handling at airports, in the area of traffic monitoring (toll systems), in retail, parcel distribution or also in the area of building security (access control).

Another sub-area of process automation in the industrial environment is factory/production automation. Use cases for this can be found in a wide variety of industries, such as automotive manufacturing, food production, and pharmaceutical industry or generally in the field of packaging. The aim of factory automation is to automate the production of goods by machines, production lines and/or robots, i.e. to let it run without the involvement of humans.

The process automation network provides the communication between the endpoints and network devices. Network devices may be communication endpoints such I/O devices, process controllers, servers, HMI devices, or networking elements such as routing devices as, for example, routers, switches and gateways, which are summarized as "switches" herein.

A process application may be, for example, an application for controlling an actuator, where the controlling is based on a monitoring data from a sensor. The process application, however, may also be, a communication application, for example, for communicating evaluated measurements to a server or an HMI.

Topology data may be data of a planned or existing network. The data may be provided, for example, using standardized topology descriptions, for example, in form of graphs, trees, as XML files, YANG or TOSCA models, using JSON, or by a Representational State Transfer (REST) interface. The connectivity requirements may be provided for example, using files or API calls.

The network controller creates the configuration for each of the network devices. For finally configuring the operational network, these configurations have to be downloaded to the network devices. In this disclosure, the network configuration response contains the network configuration before downloading the configuration files/models. That is, the network configuration of the network configuration response is not the current network configuration and is especially not necessarily a configuration, which will be downloaded at all. As described below, the download is preferably performed only when the network configuration and topology are optimized. The network configuration response may contain additional information, such as whether a network device would not have been configured successfully. The response is analyzed and if all optimization criteria are met, the optimization process is finished. If the optimization criteria are not met, further actions may be taken such as further optimizing the network. If the optimization criteria are met, the optimization is finished and the configuration would be ready for download to the network devices.

According to an embodiment, the topology data includes a representation of the resources of the networking equipment from a device catalog. The representation of the resources is needed so that the controller knows what the concrete equipment looks like.

According to an embodiment, providing connectivity requirement data comprises creating communication intents containing the connectivity requirement data and providing the communication intents as connectivity requests to the network controller.

The communication intents define on an abstract level the intended communication between communication endpoints and the input from and output to the process. They may further define what behavior or state is expected from the network without defining how this should be implemented. Further, they may also specify timing and Quality of Service (QoS) information. A communication intent may imply certain traffic that will be transmitted over the network, as for example, OPC UA pub sub between controller and IO device, or EAP-TLS communication between a switch and a RADIUS server. Therefore, requirements or specifications for the traffic have to be formally described. The intended communication may be implemented as data streams or flows which require a bandwidth or other characteristics that can be taken into account by defining connection requirements, including a behavior of the network. A behavior of the network is, for example, a dynamic behavior such as latency to be guaranteed between two endpoints or a static state such as enabling port-based access control on a network segment. A connection may be a one-by-one connection or a connection between one communication endpoint and several communication endpoint, such as a multicast connection.

The connectivity requests may be performed using API calls. They may comprise parameters requiring reliability and/or redundancy and QoS requirements. The network controller receives the connectivity requirement data by these calls, tries to allocate the network resources and to configure the network devices, and detects, whether the allocation or configuration was successful or not. The term "network configuration response" expresses detecting and reporting whether the allocation or configuration was successful or not, and may also contain additional information of the root-cause. Therefore, network configuration response may comprise at least temporarily collecting and storing the allocation and configuration results, and providing a response to the connectivity request, e.g. the API call.

An example of such a root-cause may be the overloading of a network link that would have to bear traffic beyond its capacity, say 100 Mps. This can now be addressed in topology engineering by selecting a device with Gigabit capabilities from the vendor catalog.

The action of providing one or more connectivity requests to the network controller is also referred to as "transaction." A transaction may provide a complete set of connectivity requests, for example, for allocating resources for the complete network and verifying the complete network, or a part of connectivity requests concerning a part of the network for required modifications of the network due to changes in the applications, etc. Therefore in one transaction one or more connectivity requests may be provided to the network controller, and all connectivity requests may be provided by one or more transactions.

According to an embodiment, the network controller creates the network configuration by virtually allocating network configuration resources, and the network configuration response information contains the virtual network configuration and/or information about success or failure of each virtual resource allocation.

The configuration preparation may be separated from the deployment step. "Virtually" therefore means that the configuration is not downloaded to the network devices, i.e., the network is not changed by the network controller before the optimization is finished. The network controller may thus be run in offline mode in a closed loop. As mentioned above, the network controller creates the network configuration, which is not the current network configuration and which is especially not necessarily a configuration, which will be downloaded at all. Additionally or alternatively, the response may contain information about success or failure of each virtual resource allocation. That is, the network controller may actively provide failure information. Such information may include information such as which device would not have been successfully configured when trying to configure it.

According to an embodiment, verifying whether the network configuration meets the optimization criteria comprises detecting undersized resources and oversized network resources, and the updating of the network topology design and/or the process application design is performed if undersized network resources or oversized resources have been detected.

The detailed network controller output is captured by receiving the network configuration response from the network controller. The response is analyzed for completeness of the network configuration and whether the configuration meets the connectivity requirements. If the connectivity requirements are not met, the resources are undersized or missing. The resources are identified by the analysis and are enhanced. E.g., network devices have to be replaced, added, or re-configured, where network devices may cover generic switches but also real products. That is, the topology has to be updated. Similarly, if the connectivity requirements are met, the resources may be oversized. The oversized resources are identified by the analysis and are reduced. E.g., network devices have to be replaced, removed, or re-configured. Since there may be many parameters to be taken into account, i.e. besides connectivity requirements also costs in terms of price, and because there may be parameters where a degraded performance would be acceptable if necessary, one or more cost functions may be applied. The optimization criteria may be fulfilling the one or more cost functions. For example, the value of a cost function has to be higher or lower than a threshold or lie within a range. The parameters in the cost function may be weighted.

According to an embodiment, the first through fourth steps are repeated after updating the network topology design and/or the process application design until the optimization criteria are met.

That is, the first step to the fourth step of the method are repeated until the connectivity needs can be met and the defined network cost functions are satisfied so that no additional resource is required or can be removed, within the margin of the cost functions.

According to an embodiment, the method further comprises further comprises the step generating a Bill of Material (BOM) based on the optimization result and adapted equipment in the topology data.

According to an embodiment, the method further comprises the step deploying the network configuration, by the network controller, when the optimization is stopped. When the optimization is finished, the configurations created by the network controller may be downloaded to the network devices such that the network with the optimized configuration gets operational.

According to an embodiment, the method is run during the process automation network is operational and the topology data and/or connectivity requirements contain changes compared to the real network and operational connections.

In other words, the method is carried out in parallel with the operation of the process automation network. The process automation network may be re-configured "on-the-fly", i.e., during ongoing operation. The current operation and configuration of the network will not be affected.

That is, the network may be operational, but changes to the topology/resources with the same application or a changing application needs are assessed before actually changing the network. Further, changes like reduced radio channel capacity may invalidate a virtual resource plan, i.e., topology. Existing requests can then be re-run against the new resource baseline. In case of reconfigurable applications, for example, bitrate and compression-technology in video streaming, e.g. H.264 vs MJPG, the response of the network controller can be fed back to the application design in order to allow applications to adapt to the network capabilities and spare resources.

According to an embodiment, the connectivity requests are aggregated over time and the aggregated connectivity requests are provided to the network controller in one transaction. Such a "bulk request" allows for detecting and escalating resource bottlenecks, before a sequence of requests is deployed on the operational topology and resource are actually reserved. Therefore, any unnecessary processing is avoided.

According to an embodiment, the network controller may process an entire set of connectivity requests simultaneously. The network controller may process an entire set of connectivity requests simultaneously thereby enhancing the efficiency and avoiding sequential processing, however, the network controller may also process only a part of the set simultaneously.

The process automation network may be a real network or a non-real or non-accessible network. The network may not be an implemented network but a mere design or it may be a real network that is not accessible but its design is available. That is a topology or network configuration can be optimized independent on whether it is available or already existing.

According to an embodiment, the connectivity requests include reservation requests. The reservation requests contain additional connections of existing applications or future instances of applications. The reservation requests may including a defined percentage of additional connections of existing applications or potential/planned future instances of applications to verify that the designed network has enough spare resources for future extensions or changes.

According to an embodiment, the connectivity requests are provided as incremental transactions of single or multiple requests each. As explained above, a transaction comprises a set of connection requests that is transmitted to the network controller, for example, in one iteration, i.e. when performing the five steps of the method. Several incremental transactions of additional requests may be run to simulate that in practice, application extensions might be done incrementally, i.e., when they become relevant in an operational system. This will consider aspects such as resource fragmentation and prevent having to reserve resources that still have some uncertainty to be required.

One key use is also to simulate network behavior for a longer-running period of continuous change of applications to know how extensible it would be, where requests are used that are representative of typical changes. If all future requests were known, they may all be out into one transaction.

According to an embodiment, the network configuration response information includes the root-cause of an allocation failure. The network controller may detect and indicate the root-cause when an allocation failure occurs. The root-cause may be taken into account when updating the network topology and/or the process application design.

According to an embodiment, the network configuration response information includes information about spare resources and/or headroom for particular connectivity types. The network controller may supply information about additional resources such as spare resources or particular connectivity types.

It might be useful to first request a transaction comprising real connectivity and spare connectivity, and then subsequently to request a transaction without spare connectivity because the resource allocation could differ from requesting just a transaction of real connectivity. Both variants will verify if spare connectivity could later be configured, but the first option would also allow for a global optimization of that future network configuration.

According to a further aspect, a computer readable medium is provided. The computer readable medium comprises a program element that is configured to perform the steps of the method according to any one of the previous claims when run on a processor.

The computer readable medium may be a storage medium such as a USB stick, a CD, a DVD, a data storage device, a hard disk, or any other medium on which a program element as described above can be stored. The program element is a computer program that may be part of a computer program, but it can also be an entire program by itself. For example the computer program element may be used to update an already existing computer program to get to the present invention.

All references, including publications, patent applications, and patents, cited herein, are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE NUMERALS

102 Application design
104 Connectivity needs
112 System topology design
114 Topology data
120 Network orchestrator
122 Network controller
124 Network configuration
126 Configuration verification/analyzer
151-155 Method steps
210 remote IO device
211 primary interface "selectio1p"
212 secondary interface "selectio1s"
221 DIN-rail switch
222 DIN-rail switch
225 dual-redundant ring
226 dual-redundant ring
231 switch
232 switch
241 host "host0/edge2"
242 host "host1/edge2"
243 control function "control1p"
244 control function "control1s"

What is claimed is:

1. A computer implemented method for optimizing a process automation network, comprising: providing topology data of the process automation network that includes network devices to a network controller and providing connectivity requirement data representing intended communication of a process application between communication endpoints of the process to the network controller according to a process application design for creating a network configuration; receiving a network configuration response from the network controller; analyzing the network configuration response for verifying whether the network configuration meets optimization criteria; and, updating the network topology design and the process application design and in turn the connectivity requirements data, based on results of analyzing the network configuration response, wherein updating the process application design includes updating parameters associated with connectivity requests for the network configuration.

2. The method according to claim 1, wherein the topology data includes a representation of resources of networking equipment from a device catalog.

3. The method according to claim 2, wherein providing the connectivity requirement data comprises creating communication intents containing the connectivity requirement data and providing the communication intents as the connectivity requests to the network controller.

4. The method according to claim 1, wherein the network controller creates the network configuration by virtually allocating network configuration resources, and wherein the network configuration response information contains a virtual network configuration and/or information about success or failure of each virtual resource allocation.

5. The method according to claim 4, wherein the verifying whether the network configuration meets the optimization criteria comprises detecting undersized resources and oversized resources; and wherein the step updating the network topology design and the process application design is performed in response to detecting undersized resources or oversized resources.

6. The method according to claim 5, wherein first to fourth steps are repeated after updating the network topology design and the process application design until the optimization criteria are met.

7. The method according to claim 1, wherein the method further comprises the step generating a Bill of Material based on the optimization result and adapted equipment in the topology data.

8. The method according to claim 1, wherein the method further comprises the step deploying the network configuration, by the network controller, in response to stopping the optimization of the process automation network.

9. The method according to claim 1, wherein the method is run during the process automation network is operational and the topology data and/or the connectivity requirements data contain changes compared to a real network and operational connections.

10. The method according to claim 3, wherein the connectivity requests are aggregated over time and wherein the aggregated connectivity requests are provided to the network controller in one transaction.

11. The method according to claim 1, wherein the network controller processes may process an entire set of connectivity requests.

12. The method according to claim 3, wherein the connectivity requests include resource reservation requests.

13. The method according to claim 3, wherein the connectivity requests are provided as incremental transactions of single or multiple requests each.

14. The method according to claim 1, wherein the network configuration response information includes a root-cause of an allocation failure, information about spare resources and/or headroom for particular connectivity types.

15. The method according to claim 1, further comprising stopping the optimization of the process automation network based on results of analyzing the network configuration response, wherein updating the process application design includes updating the parameters associated with the connectivity requests for the network configuration.

\* \* \* \* \*